(12) United States Patent
Lu et al.

(10) Patent No.: US 10,650,930 B2
(45) Date of Patent: May 12, 2020

(54) GRAY CONTROL ROD HAVING A NEUTRON ABSORBER COMPRISING TERBIUM AND DYSPROSIUM

(71) Applicant: Shanghai Nuclear Engineering Research & Design Institute, Shanghai (CN)

(72) Inventors: Junqiang Lu, Shanghai (CN); Chuntao Tang, Shanghai (CN); Hui Li, Shanghai (CN); Bo Yang, Shanghai (CN); Jiwei Li, Shanghai (CN); Qianxue Ding, Shanghai (CN); Libing Zhu, Shanghai (CN); Jiazheng Liu, Shanghai (CN)

(73) Assignee: SHANGHAI NUCLEAR ENGINEERING RESEARCH & DESIGN INSTITUTE, Shanghai (CN)

( * ) Notice: Subject to any disclaimer, the term of this patent is extended or adjusted under 35 U.S.C. 154(b) by 212 days.

(21) Appl. No.: 15/031,865

(22) PCT Filed: Oct. 25, 2013

(86) PCT No.: PCT/CN2013/085971
§ 371 (c)(1),
(2) Date: Apr. 25, 2016

(87) PCT Pub. No.: WO2015/058408
PCT Pub. Date: Apr. 30, 2015

(65) Prior Publication Data
US 2016/0268008 A1    Sep. 15, 2016

(51) Int. Cl.
*G21C 7/103*    (2006.01)
*G21C 7/06*    (2006.01)

(52) U.S. Cl.
CPC .............. *G21C 7/103* (2013.01); *G21C 7/06* (2013.01); *Y02E 30/39* (2013.01)

(58) Field of Classification Search
CPC .......... G21C 7/103; G21C 7/104; G21C 7/04; G21C 7/10; G21C 7/24; G21C 3/326; G21C 7/06
See application file for complete search history.

(56) References Cited

U.S. PATENT DOCUMENTS 3,185,652 A * 5/1965 Kleber .................... C04B 35/71
                                                252/478
3,280,329 A * 10/1966 Harmer .................... G21F 1/02
                                                376/339

(Continued)

FOREIGN PATENT DOCUMENTS

| CN | 101369468 A | 2/2009 |
| CN | 101504872 A | 8/2009 |

(Continued)

OTHER PUBLICATIONS

International Search Report for International Application No. PCT/CN2013/085971 dated Jul. 7, 2014 (6 pages).

*Primary Examiner* — Jack W Keith
*Assistant Examiner* — Daniel Wasil
(74) *Attorney, Agent, or Firm* — Fitch, Even, Tabin & Flannery LLP

(57) ABSTRACT

A gray control rod having a neutron absorber comprising terbium and dysprosium is provided. The neutron absorber comprises at least one first component and at least one second component, the reactivity worth of the first component increases as the service time of the neutron absorber increases, the reactivity worth of the second component decreases as the service time of the neutron absorber increases; the reactivity worth of the neutron absorber varying no more than 15% within the service time of the neutron absorber. By using the first component and the second component to form the neutron absorber, and adjusting the proportion of the respective components in the (Continued)

neutron absorber, the neutron absorber having a substantially planar reactivity worth loss characteristic can be obtained. The gray control rod and the assembly having required reactivity controlling ability can be obtained by increasing or decreasing the material dosage of the neutron absorber.

18 Claims, 5 Drawing Sheets

(56) References Cited

U.S. PATENT DOCUMENTS

| | | | | |
|---|---|---|---|---|
| 3,423,375 | A * | 1/1969 | Strand | G21F 1/10 376/339 |
| 3,891,852 | A * | 6/1975 | Bollen | G21K 4/00 250/391 |
| 5,112,534 | A * | 5/1992 | Guon | G21C 3/60 252/640 |
| 8,532,246 | B2 * | 9/2013 | Pomirleanu | G21C 7/10 376/333 |
| 8,537,962 | B1 * | 9/2013 | Drudy | G21C 7/10 376/327 |

FOREIGN PATENT DOCUMENTS

| | | |
|---|---|---|
| CN | 102915772 A | 2/2013 |
| CN | 102915773 A | 2/2013 |
| EP | 0055371 A1 | 7/1982 |
| JP | 61-159191 A | 7/1986 |

* cited by examiner

GRAY CONTROL ROD HAVING A NEUTRON ABSORBER COMPRISING TERBIUM AND DYSPROSIUM

CROSS-REFERENCE TO RELATED APPLICATION

This application is a U.S. national phase application of International Application No. PCT/CN2013/085971, filed Oct. 25, 2013, designating the United States, which is incorporated by reference herein in its entirety.

FIELD OF THE INVENTION

The present invention relates to reactive control technology of nuclear power plant, especially relates to a gray control rod and neutron absorber thereof, and gray control rod assembly.

DESCRIPTION OF THE PRIOR ART

Currently, nuclear power plants usually control the power of the reactor by raising and inserting the control rod assembly. The control rod assembly is generally divided into two categories, black control rod assembly and gray control rod assembly. In the reactor, the black control rod assembly is mainly used for emergency shutdown, while the gray control rod assembly is used for reactivity compensation and load tracking. During operation of the reactor, using the operating mode of mechanical compensation for reactivity control, that is to say, using gray control assembly instead of chemical shim (adjusting boron concentration) to provide reactivity control to the load tracking procedure and full power operating, can decrease the needs of daily disposing main reactor coolant to a minimum, so as to greatly simplify the chemical and volume control system and its operation.

The black control rod assembly includes a plurality of black control rods, which are encapsulated within neutron absorber of cylindrical shape. Commonly used materials for neutron absorber in the black control rod comprise silver-indium-cadmium alloy (Ag—In—Cd alloy, with mass fraction about 15% of In, 5% of Cd, and the rest of Ag), metal silver (Ag), metal dysprosium (Dy), metal hafnium (Hf), metal erbium (Er), metal europium (Eu), metal gadolinium (Gd), boron (B) and boron carbide ($B_4C$). The corresponding neutron absorbers are often called Ag—In—Cd alloy rod, Ag rod, Dy rod, Hf rod, Er rod, Eu rod, Gd rod, B rod and $B_4C$ rod.

Since the gray control rod assembly is used for reactivity compensation and load tracking, it is required to have a lower reactivity worth than the black control rod assembly which is mainly used for emergency shutdown. A suitable reactivity worth of the gray control rod assembly is about 20% to 45% of that of the Ag—In—Cd alloy black control rod, preferably is about 25% to 40% of that. Therefore, the conventional design of the gray control rod assembly uses a typical structure of the black control rod assembly, i.e., the neutron absorber in the gray control rod of the gray control rod assembly uses materials in that in the black control rod of the black control rod assembly, and the neutron absorber of the gray control rod has a smaller diameter than that of the black control rod, or the number of the gray control rods are less than the black control rods. For example, take gray control rod, whose neutron absorber is Ag—In—Cd alloy rod, Hf rod or Dy rod with diameter of 2 mm, or whose neutron absorber is four Ag—In—Cd alloy rod with standard diameter (8.7 mm), and twenty stainless steel rods to form the gray control rod assembly. However, because the gray control rod assembly needs to be inserted into the active region of the reactor to implement the reactivity control for a long term, elements in the neutron absorber of the gray control rod will be consumed and transmuted along with the fuel consumption. After that, the total absorption capacity will keep declining or even decline rapidly along with the fuel consumption, which will affect controlling ability of the gray control rod assembly under the operating mode of mechanical compensation.

FIG. 1 shows the reactivity worth-fuel consumption curves of Ag—In—Cd alloy rod, Hf rod and Dy rod with standard diameter (8.7 mm). It can be seen that the reactivity worth of the Ag—In—Cd alloy rod declines over 25% (taking reactivity worth of the Ag—In—Cd alloy rod with standard diameter as a benchmark for comparison).

It can be seen, although the method of reducing diameter of the neutron absorber of the gray control rod can decline the initial reactivity worth of the gray control rod assembly and can achieve a relatively weak reactivity controlling ability, but the self-shielding effect of the neutron absorber wherein will decrease correspondingly and lead to a faster decline in reactivity. Its reactivity worth at the end of its life will be less than the necessary minimum value which is required to achieve the function of the gray control rod. The method of reducing number of the gray control rods can decline the initial reactivity worth of the gray control rod assembly and can achieve a weak reactivity controlling ability, but the reactivity controlling ability in the reactor is not steady. Take Ag—In—Cd alloy rod as an example, because it has a relatively large neutron absorption cross section, especially because the neutron absorption cross section of the products transmuted by the natural isotopes Ag, In and Cd declines obviously, the reactivity worth of the gray control rod assembly will reduce to about 80% of the initial value within about five years, and will no longer meet the requirement of the reactivity worth of the gray control rod assembly under the mechanical compensation mode. It must be replaced with new gray control rod assembly. If the initial reactivity worth of the gray control rod assembly with Ag—In—Cd alloy is increased, it can compensate for the decreased amount of the reactivity worth after a long term, and correspondingly increases its working life. However, since the initial reactivity worth is significantly increased, when the gray control rod assembly is extracted from the fuel assemblies, the power level of fuel rods which adjacent to the gray control rods will rise rapidly. Therefore, PCI is more likely to occur which can affect the safety of fuel rods. Furthermore, since the Ag—In—Cd alloy will generate a large amount of Sn (tin) and Cd after being irradiated for a short time within the core. It will result in large changes of the density of the material and lead to severe volume expansion, which will cause a early rupture of the cladding tube and the failure of the gray control rod assembly.

Therefore, the time effect of the reactivity worth of the gray control rod assembly must be considered. And the gray control rod assembly should be required to have sufficient reactivity worth after a long-term until the end of life, which can satisfy the controlling ability under the operating mode of mechanical compensation. However, if the decline of the reactivity is made up for by increasing the initial reactivity worth, to make the reactivity worth of the gray control rod assembly significantly exceed the minimum required, the power distribution within the core will be affected. For example, the power distribution of the fuel assembly in the reactor core may become uneven and PCI effect will be caused. Therefore, the rate of loss of the reactivity of the material within the black control rod must be slowed down, that is to say, an appropriate method should be take to compensate for the decrease amount of its reactivity with the fuel consumption deepening.

Westinghouse Electric Corporation provides an alternative gray control rod assembly, in its Chinese patent application CN101504872A, a gray control rod assembly has been disclosed which is preferably using tungsten, tungsten alloy or tungsten compounds as the absorbent material. Since tungsten produces rhenium-187 after absorbing neutrons, the designed rod equivalents (i.e., reactivity worth) of tungsten GRCA (gray control rod assembly) has a slightly increasing trend initially, and remained relatively stable. Rhenium-187 is produced by tungsten-186 through neutron absorption and by tungsten-187 through β decay. Neutron absorption cross section of Rhenium-187 is greater than that of the parent isotope, and almost fairly compensated the slow losses of all absorption isotopes present in the tungsten originally, and has no negative effects on neutron absorption of GRCA. Thus, this technical method uses the increased reactivity worth of the descendant element produced by transmutation of tungsten within the gray control rod assembly to compensate for the reduced reactivity worth of tungsten over time, and gains substantially planar reactivity worth loss characteristic. Thereby it solves the problem that the gray control rod assembly using Ag—In—Cd alloy has rapid loss and peaks appear in partial power.

However, the material tungsten of the neutron absorbent disclosed in the technical method of the patent application above is high-density material. Limited by the high-density of tungsten, to ensure that the weight of the gray control rod assembly does not exceed the load limit of CRDM, the amount of tungsten that can fill in the cladding tube of the control rod is relatively small. It cannot be filled up with tungsten rods whose diameter is more than 6.4 mm. And it has been taken into account that the rest space of the cladding tube must be filled up with support tube material made of iron, nickel, zirconium-based alloy (its weight is quite impressive), the amount of tungsten must be further reduced. Thereby the maximum reactivity worth provided by the neutron absorber using tungsten will be further reduced. This is a limitation on the maximum reactivity worth that the gray control rod assembly can provide. In fact, for the neutron absorbing material whose neutron absorbing capacity is not strong, for example, whose microscopic absorption cross section is 10-30 barns, even when the space in the cladding tube of the gray control rod has been completely filled, the reactivity worth equivalent to or more than that of 5 standard Ag—In—Cd alloy rods cannot be achieved. Thus, for reactors having large power and more fuel assemblies capacities in the reactor core, if gray control rod assembly using neutron absorbing material of weaker neutron absorbing capacity such as tungsten, in order to obtain the same reactivity control capability, more steps have to be taken to achieve the functional requirements of operating mode of mechanical compensation. It is not only bring inconvenience to the strategies of choosing operating mode of mechanical compensation, but also significantly increases the wear of the gray control rod assembly, the expected life will be shortened and will not even meet the requirements of reactivity controlling capability of some large reactor.

Thus, those skilled in the art are devoted to develop a gray control rod and a neutron absorber thereof, and a gray control rod assembly, which can obtain a greater reactivity worth, and can achieve substantially planar reactivity worth loss characteristic.

SUMMARY OF THE INVENTION

In view of the above-mentioned defects of the prior art, the technical problem to be solved by the present invention is to provide a gray control rod and a neutron absorber thereof, and a gray control rod assembly. By using neutron absorber material of the black control rod, which has a large neutron absorption cross section and neutron absorbing ability, as a component of the neutron absorber of the gray control rod, and adding other component(s) to compensate and adjust, a gray control rod and a gray control rod assembly with larger range of reactivity worth can be achieved.

To realize the above object, the present invention provides a neutron absorber of a gray control rod, characterized in that the neutron absorber comprises at least one first component and at least one second component, reactivity worth of the first component increases as service time of the neutron absorber increases, reactivity worth of the second component decreases as the service time of the neutron absorber increases; reactivity worth of the neutron absorber varies no more than 15% within the service time of the neutron absorber; and the service time is no more than 20 years.

In a further embodiment, the first component is metal terbium, metal praseodymium, metal nickel, or compound of terbium, praseodymium, nickel, or alloy comprising terbium, praseodymium, nickel; the second component is metal silver, metal dysprosium, metal hafnium, metal erbium, metal europium, or compound of silver, dysprosium, hafnium, erbium, europium, boron, or alloy comprising silver, dysprosium, hafnium, erbium, europium. The first component, the second component and the neutron absorber may be porous, or density reduced, or diluted, or in a form of alloy, or in a form of compound.

In a further embodiment, the first component is metal terbium, or terbium oxide, or terbium titanate, or terbium alloy.

In a further embodiment, the neutron absorber is terbium-dysprosium alloy, or sinter of mixture of terbium oxide and dysprosium oxide, or sinter of mixture of dysprosium titanate and terbium titanate.

In a further embodiment, the neutron absorber is a cylinder with diameter of D, wherein $1.0 \text{ mm} \leqslant D \leqslant 8.7 \text{ mm}$, and unit of D is millimeter; mass fraction of element terbium in the neutron absorber is x, wherein $-0.0688 \times D+0.6388 \leqslant x \leqslant -0.0026 \times D+0.8626$; the reactivity worth of the neutron absorber varies no more than 10% within the service time of the neutron absorber.

In a further embodiment, in the neutron absorber, $-0.0571 \times D+0.7371 \leqslant x \leqslant 0.0039 \times D+0.7261$; the reactivity worth of the neutron absorber varies no more than 5% within the service time of the neutron absorber.

In a further embodiment, $1.3 \text{ mm} \leqslant D \leqslant 3.3 \text{ mm}$.

In a further embodiment, $1.8 \text{ mm} \leqslant D \leqslant 3.0 \text{ mm}$.

In a further embodiment, D=2 mm, x=70%; the reactivity worth of the neutron absorber varies no more than 2.8% within the service time of the neutron absorber.

The present invention also discloses a gray control rod, comprising a cylindrical cladding tube, an upper end plug and a lower end plug for sealing the two ends of the cladding tube, neutron absorber being encapsulated in the cladding tube, characterized in that the neutron absorber comprises at least one first component and at least one second component, reactivity worth of the first component increases as service time of the neutron absorber increases, reactivity worth of the second component decreases as the service time of the neutron absorber increases; reactivity worth of the neutron absorber varies no more than 15% within the service time of the neutron absorber; and the service time is no more than 20 years.

In a further embodiment, the first component is metal terbium, metal praseodymium, metal nickel, or compound of terbium, praseodymium, nickel, or alloy comprising terbium, praseodymium, nickel; the second component is metal silver, metal dysprosium, metal hafnium, metal erbium, metal europium, or compound of silver, dysprosium, hafnium, erbium, europium, boron, or alloy comprising silver, dysprosium, hafnium, erbium, europium. The first component, the second component and the neutron absorber may be porous, or density reduced, or diluted, or in a form of alloy or in a form of compound.

In a further embodiment, the neutron absorber is terbium-dysprosium alloy, or sinter of mixture of terbium oxide and dysprosium oxide, or sinter of mixture of dysprosium titanate and terbium titanate.

In a further embodiment, the neutron absorber is a cylinder with diameter of D, wherein $1.0 \text{ mm} \leq D \leq 8.7 \text{ mm}$, and unit of D is millimeter; mass fraction of element terbium in the neutron absorber is x, wherein $-0.0688 \times D + 0.6388 \leq x \leq -0.0026 \times D + 0.8626$; the reactivity worth of the neutron absorber varies no more than 10% within the service time of the neutron absorber.

In a further embodiment, in the neutron absorber, $-0.0571 \times D + 0.7371 \leq x \leq 0.0039 \times D + 0.7261$; the reactivity worth of the neutron absorber varies no more than 5% within the service time of the neutron absorber.

In a further embodiment, $1.3 \text{ mm} \leq D \leq 3.3 \text{ mm}$.

In a further embodiment, $1.8 \text{ mm} \leq D \leq 3.0 \text{ mm}$.

In a further embodiment, D=2 mm, x=70%. The reactivity worth of the neutron absorber varies no more than 2.8% within the service time of the neutron absorber.

The present invention also discloses a gray control rod assembly, comprising multiple gray control rods, each gray control rod comprising a cylindrical cladding tube, an upper end plug and a lower end plug for sealing the two ends of the cladding tube, neutron absorber being encapsulated in the cladding tube, characterized in that the neutron absorber comprises at least one first component and at least one second component, reactivity worth of the first component increases as service time of the neutron absorber increases, reactivity worth of the second component decreases as the service time of the neutron absorber increases; reactivity worth of the neutron absorber varies no more than 15% within the service time of the neutron absorber; the service time is no more than 20 years.

In a further embodiment, the first component is metal terbium, metal praseodymium, metal nickel, or compound of terbium, praseodymium, nickel, or alloy comprising terbium, praseodymium, nickel; the second component is metal silver, metal dysprosium, metal hafnium, metal erbium, metal europium, or compound of silver, dysprosium, hafnium, erbium, europium, boron, or alloy comprising silver, dysprosium, hafnium, erbium, europium. The first component, the second component and the neutron absorber may be porous, or density reduced, or diluted, or in a form of alloy or in a form of compound.

In a further embodiment, the neutron absorber is terbium-dysprosium alloy, or sinter of mixture of terbium oxide and dysprosium oxide, or sinter of mixture of dysprosium titanate and terbium titanate; the neutron absorber is a cylinder with diameter of D, wherein $1.0 \text{ mm} \leq D \leq 8.7 \text{ mm}$, and unit of D is millimeter; mass fraction of element terbium in the neutron absorber is x, wherein $-0.0688 \times D + 0.6388 \leq x \leq -0.0026 \times D + 0.8626$; the reactivity worth of the neutron absorber varies no more than 10% within the service time of the neutron absorber.

In a further embodiment, in the neutron absorber, $-0.0571 \times D + 0.7371 \leq x \leq 0.0039 \times D + 0.7261$; the reactivity worth of the neutron absorber varies no more than 5% within the service time of the neutron absorber.

In a further embodiment, $1.3 \text{ mm} \leq D \leq 3.3 \text{ mm}$.

In a further embodiment, $1.8 \text{ mm} \leq D \leq 3.0 \text{ mm}$.

In a further embodiment, D=2 mm, x=70%; the reactivity worth of the neutron absorber varies no more than 2.8% within the service time of the neutron absorber.

In a preferred embodiment, the present invention provides a neutron absorber of a gray control rod, which comprises a first component and a second component. Wherein the first component is metal terbium or compound of terbium, or alloy comprising terbium; the second component is metal dysprosium, compound of dysprosium or alloy comprising dysprosium, or silver-indium-cadmium alloy. Using Dy—Tb alloy rod as neutron absorber has been analyzed. In particular, for the situations of terbium with different mass percentage (30%, 50%, 68%, 70% and 90%) and Dy—Tb alloy rod having different diameters (1 mm, 2 mm, 3 mm and 8.7 mm), the reactivity worth of the gray control rod assembly using Dy—Tb alloy rod as neutron absorber have been calculated at different service time, and the curves of the corresponding reactivity worth versus the service time has been obtained (see FIG. 3). The present invention analyses the above calculation results (see FIG. 4) and gives a fitting formula. Thus mass fraction of Tb and diameter of the Dy—Tb alloy rod can be estimated for the needed reactivity worth of the gray control rod assembly using Dy—Tb alloy rod as neutron absorber and the amplitude of the reactivity worth varied with respect to the service time (see FIGS. 5 and 6). Accordingly, the gray control rod and the gray control rod assembly using the above neutron absorber have been given in the present invention.

Thus, the present invention can obtain the neutron absorber having substantially planar reactivity worth loss characteristic through using the neutron absorber, which comprises component whose reactivity worth increases and component whose reactivity worth decreases with the increase of service time, and adjusting the proportion of the components in the neutron absorber. By increasing or decreasing the material dosage of the neutron absorber, the gray control rod and the assembly which have the required reactivity controlling ability can be obtained. This is different from the gray control rod and the assembly disclosed in patent CN101504872A. In patent CN101504872A, $^{187}$Re, transmuted from an isotope of tungsten $^{186}$W, has a larger neutron absorption cross section than $^{186}$W, thus compensating for the slowly decreasing of the reactivity worth caused by other isotopes of tungsten. There are two natural radionuclides of element Re, one is $^{185}$Re with abundance of 37.4%, the other is $^{187}$Re with abundance of 62.6%. $^{185}$Re transmutes into $^{186}$Re, and creates $^{186}$Os through β decay, the reactivity worth decrease slowly. $^{186}$Os creates $^{187}$Os, and the reactivity worth increase slowly. When $^{187}$Os creates $^{188}$Os and stop the reaction, the reactivity worth decrease slowly. That is to say, the reactivity worth of $^{185}$Re generally remains stable. But $^{187}$Re creates $^{188}$Re and create $^{188}$Os rapidly through β decay, the reactivity worth decrease significantly. Therefore, the total effect of these two isotopes leads the reactivity worth of element Re generally decreasing with service time.

Compared with neutron absorber using tungsten, using the neutron absorber in the present invention such as neutron absorber of Dy—Tb alloy has advantages as follows. First of all, the thermal neutron absorption cross section of the element Dy (930 barns) is very large, the thermal neutron absorption cross section of element Tb (25.5 barns) and resonance absorption cross section (418 barns) is large, the neutron absorption capacity of them are much higher than that of tungsten. And the density of element Dy (8.54 g/cm$^3$) and element Tb (8.23 g/cm$^3$) are small, even smaller than the density of the Ag—In—Cd alloy (10.17 g/cm$^3$), so the amount of the Dy—Tb alloy will not be limited by the density. Therefore, using this kind of alloy as the neutron absorber will significantly increase the maximum reactivity worth of the gray control rod assembly. The reactivity worth of element Dy exhibits nearly linear decrease with the fuel consumption, as shown in the reactivity worth—service time curve of element Dy in FIG. 1. But the reactivity worth of element Tb exhibits nearly linear increase with the fuel consumption. By adjusting the proportion of element Dy and element Tb in the neutron absorber, such as 1:1 (as Dy-50Tb shown in FIG. 2, the mass fraction of element Tb in the neutron absorber is 50%, the rest is Dy), a more planar reactivity worth loss characteristic than that of tungsten can be obtained, and the risk of PCI is lower. The similar effect can be achieved by adding element Tb into the Ag—In—Cd alloy rod or combining them through a certain structure. As Ag—In—Cd-50Tb shown in FIG. 2, the mass fraction of element Tb in the neutron absorber is 50%, the rest is Ag—In—Cd alloy.

Secondly, the maximum value of the reactivity worth of the gray control rod assembly using neutron absorber such as Dy—Tb alloy in the present invention is much greater than that of tungsten in prior art. As shown in FIG. 2, the maximum relative reactivity worth of the control rod assembly using Dy-50Tb alloy rod and Ag—In—Cd-50Tb alloy rod as neutron absorber are 1.37 and 1.23 respectively. the maximum relative reactivity worth of the gray control rod assembly using tungsten rod as neutron absorber is 0.27. Therefore, it is easy to obtain the relative reactivity of the required value of 0.20 to 0.45 of the gray control rod assembly and obtain the preferably relative reactivity worth of 0.25 to 0.40 by reducing the diameter of the Dy—Tb alloy rod.

Further, as illustrated in FIG. 3, for control rod assemblies using Dy—Tb alloy rod with different diameters and components as their neutron absorber, their relative reactivity worth distribute within a large range (relative reactivity worth of 0.18 to 1.37), and can remain relatively planar reactivity worth loss characteristics or even more planar than that of tungsten when being configured with a certain percentage of chemical composition and a particular diameter. It is easy to obtain the relative reactivity of the required value of 0.20 to 0.45 of the gray control rod assembly and obtain the preferably relative reactivity worth of 0.25 to 0.40. For example, for gray control rod assembly using Dy-70Tb alloy rod with a diameter of 2 mm as the neutron absorber, the relative reactivity worth is 0.27. For another example, for gray control rod assembly using Dy-68Tb alloy rod with a diameter of 2 mm as the neutron absorber, the relative reactivity worth is 0.40. By using the neutron absorber of the present invention, gray control rod assembly having large reactivity worth can be obtained, such as the relative reactivity worth of 0.30, which can not only bring convenience to selecting strategies of operating mode of mechanical compensation, but can also significantly reduce stepping number of the gray control rod assembly, reduce the wear of the cladding tube of the gray control rod and extend the life of the gray control rod assembly.

In addition, element Tb is very rare, and its price is expensive, and its thermal neutron absorption cross section is not high (25.5 barns). But its resonance absorption cross section (418 barns) is large, especially it will creates $^{160}$Tb (525 barns) and $^{161}$Dy (600 barns) with strong absorptive capacity by transmutation, and therefore it will generally not be considered as absorbing material of the gray control rod. However, as shown in the present invention, it can be used as the neutron absorber together with strong absorber elements (such as Dy) of which the reactivity worth decrease with fuel consumption, the amount used of it is small to obtain gray control rod assembly with lower reactivity worth than black control rod assembly. Therefore, when metal Tb or compound of Tb or alloy comprising Tb is used as the neutron absorber, as mentioned in the present invention, the cost of them will not be so high, and are completely within the acceptable range.

Referencing now to the FIGS., the conception, detailed structure and induced technical effect of the present invention will be expounded for due understanding of the purpose, characterizations and effects of the present invention:

DETAILED DESCRIPTION OF THE PREFERRED EMBODIMENTS

Figure 1:
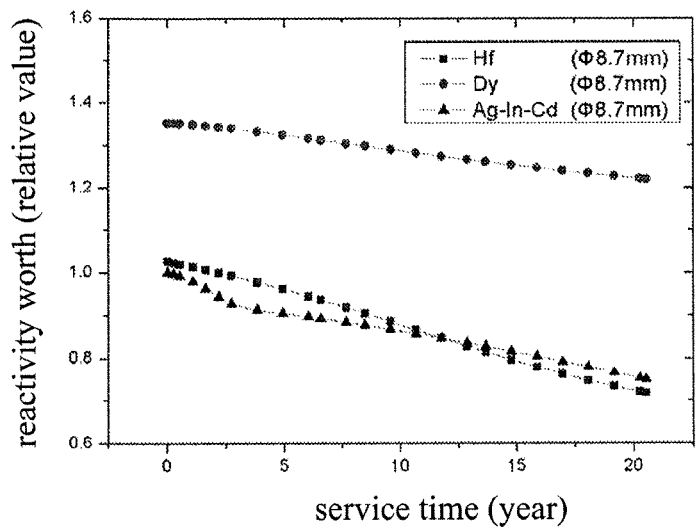
FIG. 1 shows the relationship curves of reactivity worth with respect to service time for the gray control rod assemblies using pure Hf rod, pure Dy rod and Ag—In—Cd alloy rod with standard diameter as their neutron absorbers. The reactivity worth showed in the figure are relative values compared with the initial reactivity worth of the gray control rod assembly using Ag—In—Cd alloy rod with standard diameter as the neutron absorber.

In the present invention, using Dy—Tb alloy rod as neutron absorber 1 has been analyzed. In particular, for the situation of terbium with different mass percentage (30%, 50%, 68%, 70% and 90%) and Dy—Tb alloy rod having different diameters (1 mm, 2 mm, 3 mm and 8.7 mm), the reactivity worth of the gray control rod assembly using Dy—Tb alloy rod as neutron absorber 1 has been calculated at different service time. The calculated result has been shown in FIG. 3. In the figure, Dy-50Th (Φ1.0 mm) represents dysprosium terbium alloy rod with Tb mass fraction of 50% and the diameter of 1.0 mm. Representation of other alloy rods is the same and will not be described repeatedly here.

The figure shows the relationship curves of reactivity worth with respect to service time for the gray control rod assemblies using Dy—Tb alloy rods with different diameter and mass fraction of Tb as their neutron absorbers. The reactivity worth showed in the figure is a relative value compared with the initial reactivity worth of the gray control rod assembly using Ag—In—Cd alloy rod with standard diameter as the neutron absorber. That is to say, the initial reactivity worth of the gray control rod assembly using Ag—In—Cd alloy rod with standard diameter as the neutron absorber is 1.0. The following reactivity worth (relative value), which will not be specifically described, and the relative reactivity worth are all relative to the initial reactivity worth of the gray control rod assembly using Ag—In—Cd alloy rod with standard diameter as the neutron absorber. The service time is not longer than 20 years, since the neutron absorber is encapsulated in a cladding tube of the gray control rod, and the gray control rod is a part of the gray control rod assembly, the service time can be the service time of the neutron absorber, and can also be the service time of the gray control rod or the gray control rod assembly.

The ratio of the difference between the maximum and the minimum value to the minimum value (i.e., the ratio of the maximum value to the minimum value minus 1) of the reactivity worth of the gray control rod assembly during the whole lifetime (20 years) is called the amplitude of variation of the reactivity worth relative to the service time (amplitude of variation or amplitude of variation of the reactivity worth for short). In general, when the amplitude of variation is less than 10%, the variation of the reactivity worth will not affect the operating mode of mechanical compensation strategy, and will not significantly increase the risk of PCI. Calculating the amplitude of variation of the reactivity worth of the gray control rod assembly using Dy—Tb alloy rod with different diameter and mass fraction of Tb as the neutron absorbers shown in FIG. 3, the relationship curves of the amplitude of variation of reactivity worth with respect to the mass fraction of Tb can be fitted and obtained for the gray control rod assemblies using Dy—Tb alloy rods with diameter of 1.0 mm and 8.7 mm as the neutron absorbers as shown in FIG. 4.

Figure 4:
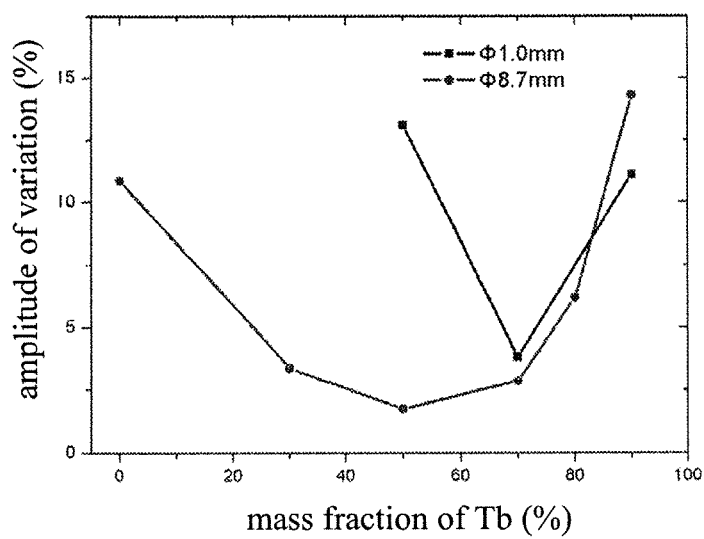
FIG. 4 shows the relationship curves of amplitude of variation with respect to mass fraction of Tb for the gray control rod assemblies using Dy—Tb alloy rod with diameter of 1.0 mm and 8.7 mm as their neutron absorbers, the amplitude of variation is the amplitude of variation of the reactivity worth relative to the service time.

The following conclusions can be derived from the fitting curves of FIG. 4: for Dy—Tb alloy rod of 1 mm, the amplitude of variation is no more than 10% when mass fraction of Tb is between 57 to 86%, for Dy—Tb alloy rod of 8.7 mm, the amplitude of variation is no more than 10% when mass fraction of Tb is between 4 to 84%. That is, an amplitude of variation of no more than 10% can be obtained by combining the composition (the mass fraction of Tb is x) which is in the region enclosed by the solid squares and lines in FIG. 5 and the diameter D (unit: mm) of the Dy—Tb alloy rod. The region can also be expressed by the formula as: $-0.0688 \times D + 0.6388 \leq x \leq -0.0026 \times D + 0.8626$, $1.0 \text{ mm} \leq D \leq 8.7 \text{ mm}$.

The following preferred conclusions can be derived from the fitting curves from FIG. 4: for Dy—Tb alloy rod of 1 mm, the amplitude of variation is no more than 5% when mass fraction of Tb is between 68 to 73%, for Dy—Tb alloy rod of 8.7 mm, the amplitude of variation is no more than 5% when mass fraction of Tb is between 24 to 76%. That is, an amplitude of variation of no more than 5% can be obtained by combining the composition (the mass fraction of Tb is x) which is in the region enclosed by the solid circles and lines in FIG. 5 and the diameter D (unit: mm) of the Dy—Tb alloy rod. The region can also be expressed by the formula as: $-0.0571 \times D + 0.7371 \leq x \leq 0.0039 \times D + 0.7261$, $1.0 \text{ mm} \leq D \leq 8.7 \text{ mm}$.

Figure 6:
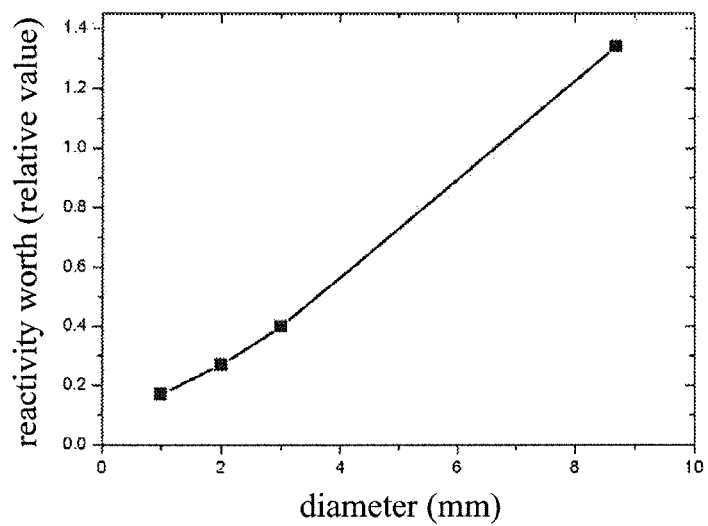
FIG. 6 shows the relationship curve of reactivity worth with respect to diameter of the Dy—Tb alloy rod for the gray control rod assembly using Dy—Tb alloy rod as the neutron absorber. The reactivity worth showed in the figure are relative values compared with the initial reactivity worth of the gray control rod assembly using Ag—In—Cd alloy rod with standard diameter as the neutron absorber.
Figure 7:
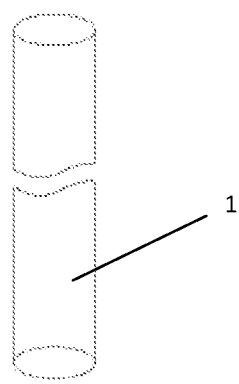
FIG. 7 is a schematic view of a neutron absorber of a gray control rod in accordance with the invention.
Figure 8:
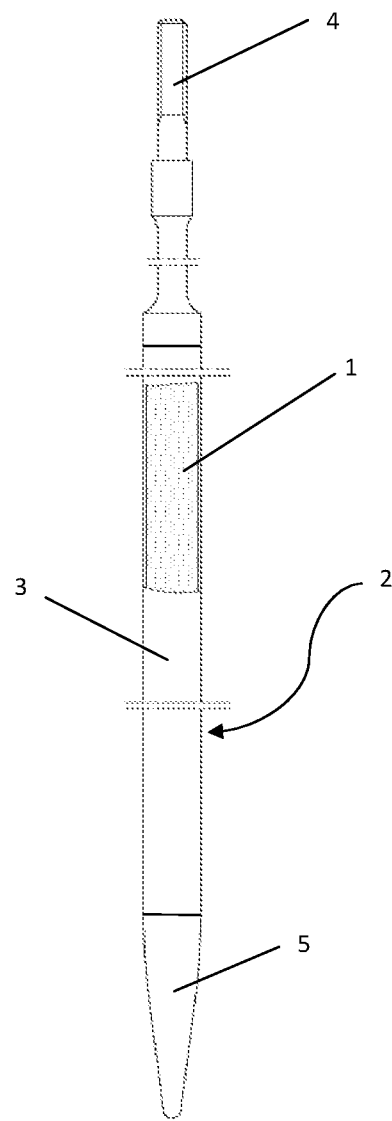
FIG. 8 is a partially sectioned elevational view of a gray control rod in accordance with the invention.
Figure 9:
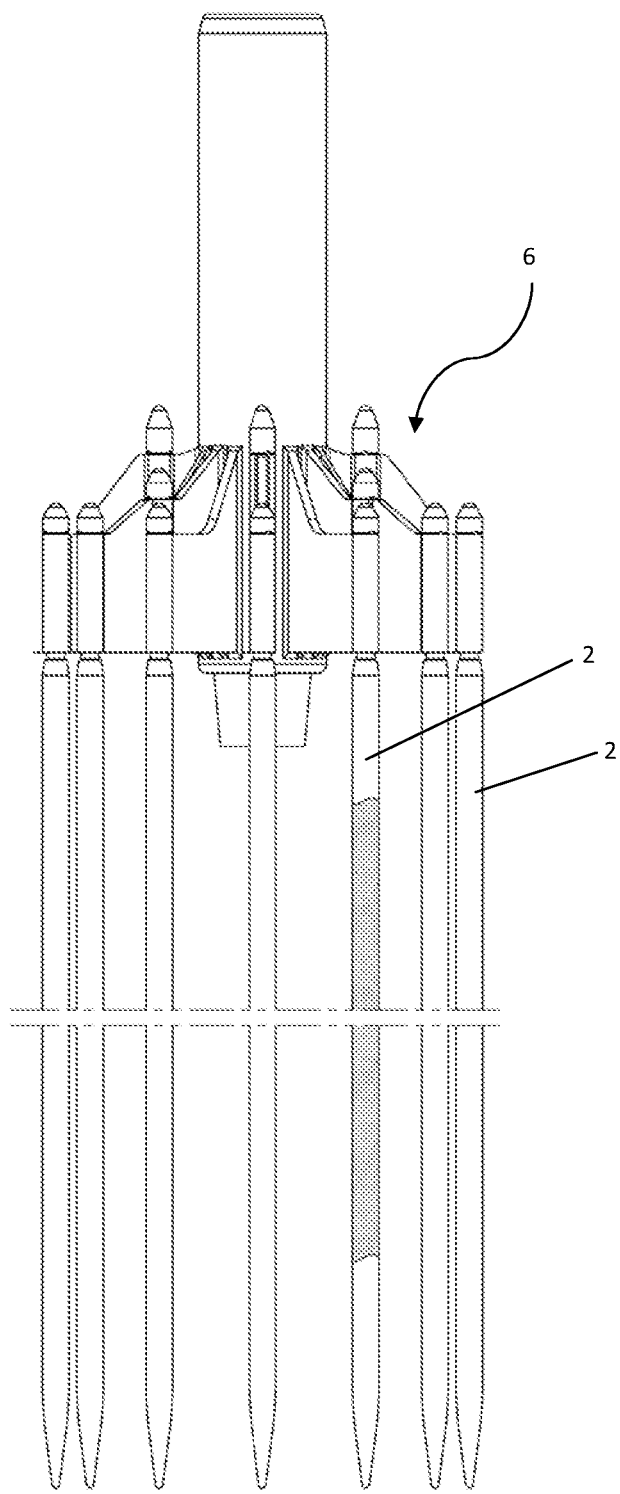
FIG. 9 is a partially sectioned elevational view of a gray control rod assembly in accordance with the invention.

The relationship curves of reactivity worth with respect to diameter for the gray control rod assemblies using Dy—Tb alloy rods as the neutron absorbers are shown in FIG. 6. It can be seen from FIG. 6, when the reactivity worth (relative value, or so-called relative reactivity worth) is 0.20, the corresponding diameter of Dy-70Tb alloy rod is 1.3 mm; when the relative reactivity worth is 0.45, the corresponding diameter of Dy-70Tb alloy rod is 3.3 mm. When the relative reactivity worth is 0.25, the corresponding diameter of Dy-70Tb alloy rod is 1.8 mm, when the relative reactivity worth is 0.40, the corresponding diameter of Dy-70Tb alloy rod is 3.0 mm.

Figure 3:
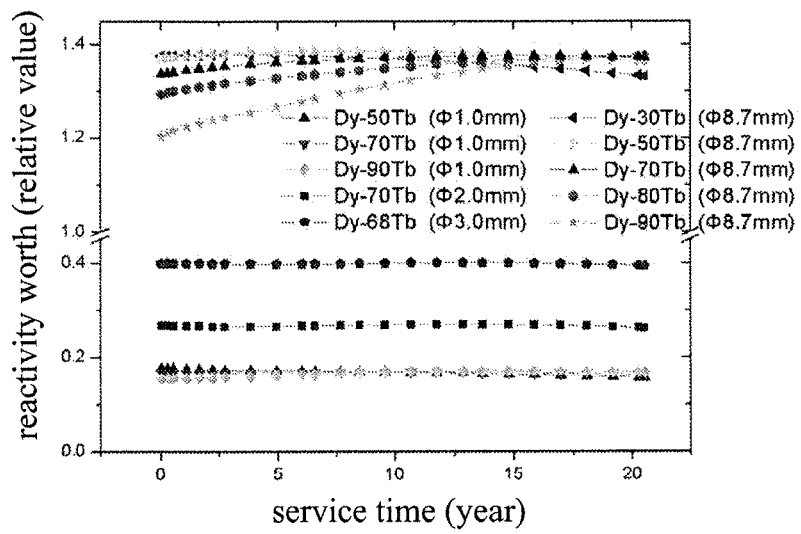
FIG. 3 shows the relationship curves of reactivity worth with respect to service time for the gray control rod assemblies using Dy—Tb alloy rod with different diameter and mass fraction of Tb as their neutron absorbers. The reactivity worth showed in the figure are relative values compared with the initial reactivity worth of the gray control rod assembly using Ag—In—Cd alloy rod with standard diameter as the neutron absorber.

It can be known from FIG. 3, the main factor affecting the reactivity worth of a gray control rod assembly is the diameter of Dy—Tb alloy rod which is used as the neutron absorber. As long as the amplitude of variation of the reactivity worth of the gray control rod assembly is no more than 10%, even the Tb content changes greatly, the diameter of the alloy rod can still be calculated through the curve shown in FIG. 6 by using the initial reactivity worth of the Dy-70Tb alloy rod.

Figure 5:
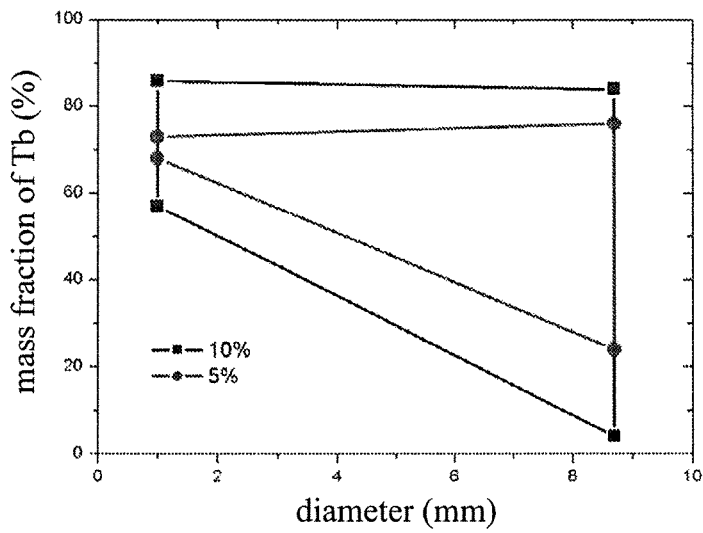
FIG. 5 shows the value range of the diameter of Dy—Tb alloy rod and mass fraction of Tb of the Dy—Tb alloy rod which serves as the neutron absorber, when its amplitude of variation of reactivity worth with respect to service time is no more than 5% and 10%.

Thus, the results in FIG. 5 are further defined to the relative reactivity worth of 0.20 to 0.45 which the gray control rod assembly requires, and to the preferred relative reactivity worth of 0.25 to 0.40. That is to say, the diameter of the Tb—Dy alloy rod corresponding to the relative reactivity worth of 0.20 to 0.45 is: $1.3 \text{ mm} \leq D \leq 3.3 \text{ mm}$; the diameter of the Tb—Dy alloy rod corresponding to the preferred relative reactivity worth of 0.25 to 0.40 is: $1.8 \text{ mm} \leq D \leq 3.0 \text{ mm}$.

The parameter range of Tb—Dy alloy rod meeting the needs of the relative reactivity worth of 0.20 to 0.45 and amplitude of variation no more than 10% of the gray control rod assembly is: $-0.0688 \times D + 0.6388 \leq x \leq -0.0026 \times D + 0.8626$, $1.3 \text{ mm} \leq D \leq 3.3 \text{ mm}$. The parameter range of Tb—Dy alloy rod meeting the needs of the relative reactivity worth of 0.25 to 0.40 and amplitude of variation no more than 10% of the gray control rod assembly is: $-0.0688 \times D + 0.6388 \leq x \leq -0.0026 \times D + 0.8626$, $1.8 \text{ mm} \leq D \leq 3.0 \text{ mm}$.

The parameter range of Tb—Dy alloy rod meeting the needs of the relative reactivity worth of 0.20 to 0.45 and amplitude of variation no more than 5% of the gray control rod assembly is: $-0.0571 \times D + 0.7371 \leq x \leq 0.0039 \times D + 0.7261$, $1.3 \text{ mm} \leq D \leq 3.3 \text{ mm}$. The parameter range of Tb—Dy alloy rod meeting the needs of the relative reactivity worth of 0.25 to 0.40 and amplitude of variation no more than 5% of the gray control rod assembly is: $-0.0571 \times D + 0.7371 \leq x \leq 0.0039 \times D + 0.7261$, $1.8 \text{ mm} \leq D \leq 3.0 \text{ mm}$.

In addition to the above Tb—Dy alloy, sinter of the mixture of terbium oxide and dysprosium oxide can also be used as the neutron absorber. The sinter is a ceramic material having a better corrosion resistance than Dy—Tb alloy. Since the neutron absorption capacity of oxygen is almost zero, it is easy for those skilled in the art to calculate and obtain the parameter range of the diameter of the terbium oxide required by the gray control rod assembly through using the above parameter range of the Tb content and diameter of the Dy—Tb alloy.

The neutron absorber comprising element Dy and Tb and other elements which have little effect on reactivity worth such as Zr, Fe, Ni, Nb and Mo also can be used. Since the neutron absorption capacity of these elements are so weak, it is easy for those skilled in the art to calculate and obtain the parameter range of the diameter of the Tb alloy required by the gray control rod assembly through using the above parameter range of the Tb content and diameter of the Dy—Tb alloy.

A more preferable solution can be used, that sinter of the mixture of dysprosium titanate and terbium titanate is used as the neutron absorber, wherein the unique structure of the material has a strong resistance to irradiation swelling. Since the neutron absorption capacity of oxygen is almost zero, and the neutron absorption capacity of titanium is so weak, it is easy for those skilled in the art to calculate and obtain the parameter range of the diameter of the terbium titanate required by the gray control rod assembly through using the above parameter range of the Tb content and diameter of the Dy—Tb alloy.

Figure 2:
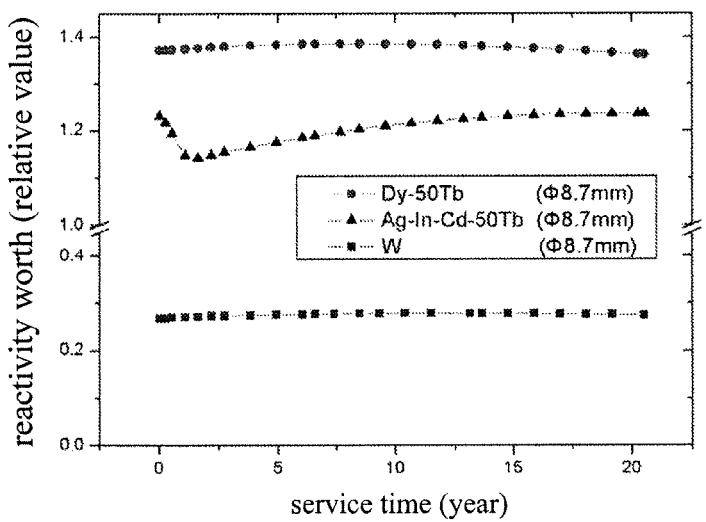
FIG. 2 shows the relationship curves of reactivity worth with respect to service time for the gray control rod assemblies using tungsten rod, Dy-50Tb alloy rod and (Ag—In—Cd)—Tb alloy rod as their neutron absorbers. The reactivity worth showed in the figure are relative values compared with the initial reactivity worth of the gray control rod assembly using Ag—In—Cd alloy rod with standard diameter as the neutron absorber.

Besides the second component of metal dysprosium or compound of dysprosium or alloy comprising dysprosium, other second component can be used, such as the second component of Ag—In—Cd alloy. The neutron absorber that is of Ag—In—Cd alloy being added with metal Tb to a mass fraction of 50% has been shown in FIG. 2. It has an improved amplitude of variation of reactivity worth relative to service time.

Besides the first component of metal terbium, terbium oxide, terbium titanate and terbium alloy, other first component can also be used, such as metal praseodymium, metal nickel, or compound of praseodymium, nickel, or alloy comprising praseodymium, nickel. They all have the characteristic that the reactivity worth increases as the service time increases.

Accordingly, the present invention provides a gray control rod 2, which consists of an elongated cladding tube 3 and an upper end plug 4 and a lower end plug 5 for sealing the two ends of the cladding tube 3. A cylindrical neutron absorber is encapsulated in the cladding tube which is made of Dy—Tb alloy. The outside of the gray control rod is covered with a cladding tube made of stainless steel or nickel-base alloy.

Preferably, the mass fraction of Tb in the Dy—Tb alloy rod is 70%, the diameter of the Dy—Tb alloy rod is 2 mm. Both the reactivity worth of the gray control rod assembly using this alloy rod as the neutron absorber and the reactivity worth of the gray control rod assembly using tungsten rod are 0.27, but the amplitude of variation of the former is 2.8%, better than that of the latter of 3.9%, as shown in FIG. 3.

The Tb—Dy alloy may also comprises 2% of impurities such as Ho, Fe, Ca, Si, Cl, O and so on.

The advantages of using Tb—Dy alloy as the neutron absorber of the gray control rod is that the property of the neutron absorption material changes little during the designed lifetime of the gray rod. After Tb—Dy alloy has been irradiated in the reactor core for a long time, element Tb decreases, element Dy increases, element holmium has been created. The density of Dy and Ho are all larger than that of Tb, their crystal structure are the same and they are solid dissolved to each other, no other phases will be generated, thus the volume expansion caused by the change of material density will not happen.

The present invention also provides a gray control rod assembly 6 for reactor, comprising 24 gray control rods. Each of them consists of an elongated cladding tube and an upper end plug and a lower end plug for sealing the two ends of the cladding tube. A cylindrical neutron absorber is encapsulated in the cladding tube which is made of Dy—Tb alloy. The outside of the gray control rod is covered with a cladding tube made of stainless steel or nickel-base alloy.

Preferably, the mass fraction of Tb in the Dy—Tb alloy rod is 68%, the diameter of the Dy—Tb alloy rod is 3 mm. The reactivity worth of the gray control rod assembly using this alloy rod is 0.40, which is larger than that of tungsten rod of 0.27, and the amplitude of variation is only 1.8%, as shown in FIG. 3.

The advantage of the gray control rod assembly is that it can meet the requirement of the reactivity worth in the large reactor with great power, and significantly reduce stepping number of the gray control rod assembly, reduce the wear of the cladding tube of the gray control rod and extend the life of the gray control rod assembly.

The present invention also provides a gray control rod assembly for reactor, comprising 24 gray control rods. Each of them consists of an elongated cladding tube and an upper end plug and a lower end plug for sealing the two ends of the cladding tube. A cylindrical neutron absorber is encapsulated in the cladding tube which is made of Ag—In—Cd—Tb alloy. The outside of the gray control rod is covered with a cladding tube made of stainless steel or nickel-base alloy.

Preferably, the mass fraction of Tb in the Ag—In—Cd—Tb alloy rod is 50%, the diameter of the Ag—In—Cd—Tb alloy rod is 3 mm. The reactivity worth of the gray control rod assembly using this alloy rod is 0.32, and the amplitude of variation is 8%.

The foregoing described the preferred embodiments of the present invention. It should be understood that an ordinary one skilled in the art can make many modifications and variations according to the concept of the present invention without creative work. Therefore, any person skilled in the art can get any technical solution through logical analyses, deductions and limited experiments, which should fall in the protection scope defined by the claims.

The invention claimed is:

1. A neutron absorber of a gray control rod, comprising a first absorber material and a second absorber material, wherein reactivity worth of the first absorber material increases as service time of the neutron absorber increases, and reactivity worth of the second absorber material decreases as the service time of the neutron absorber increases; and reactivity worth of the neutron absorber varies no more than 15% within the service time of the neutron absorber; wherein the first absorber material is metal terbium, or a compound of terbium, or an alloy comprising terbium; and the second absorber material is metal dysprosium, or a compound of dysprosium, or an alloy comprising dysprosium;

wherein the first absorber material is metal terbium, terbium oxide, terbium titanate, or terbium alloy;

wherein the neutron absorber is terbium-dysprosium alloy, sinter of mixture of terbium oxide and dysprosium oxide, or sinter of mixture of dysprosium titanate and terbium titanate;

wherein the neutron absorber is a cylinder with diameter of D, where 1.0 mm≤D≤8.7 mm, and unit of D is millimeter; mass fraction of element terbium in the neutron absorber is x, where −0.0688×D+0.6388≤x≤−0.0026×D+0.8626; the reactivity worth of the neutron absorber varies no more than 10% within the service time of the neutron absorber.

2. The neutron absorber of the gray control rod as claimed in claim 1, wherein the neutron absorber is a cylinder with diameter of D and the mass fraction of element terbium in the neutron absorber is x, where −0.0571×D+0.7371≤x≤0.0039×D+0.7261; the reactivity worth of the neutron absorber varies no more than 5% within the service time of the neutron absorber.

3. The neutron absorber of the gray control rod as claimed in claim 1, wherein the neutron absorber is a cylinder with diameter of D, where 1.3 mm≤D≤3.3 mm.

4. The neutron absorber of the gray control rod as claimed in claim 3, wherein the neutron absorber is a cylinder with diameter of D, where 1.8 mm≤D≤3.0 mm.

5. The neutron absorber of the gray control rod as claimed in claim 4, wherein the neutron absorber is a cylinder with diameter of D, where D=2 mm; wherein the mass fraction of element terbium in the neutron absorber is x, where x=70%; the reactivity worth of the neutron absorber varies no more than 2.8% within the service time of the neutron absorber.

6. A gray control rod, comprising a cylindrical cladding tube, an upper end plug and a lower end plug for sealing two ends of the cladding tube, a neutron absorber being encapsulated in the cladding tube, wherein the neutron absorber comprises a first absorber material and a second absorber material, reactivity worth of the first absorber material increases as service time of the neutron absorber increases, reactivity worth of the second absorber material decreases as the service time of the neutron absorber increases; and reactivity worth of the neutron absorber varies no more than 15% within the service time of the neutron absorber; wherein the first absorber material is metal terbium, or a compound of terbium, or an alloy comprising terbium; and the second absorber material is metal dysprosium, or a compound of dysprosium, or an alloy comprising dysprosium.

7. The gray control rod as claimed in claim 6, wherein the neutron absorber is terbium-dysprosium alloy, sinter of mixture of terbium oxide and dysprosium oxide, or sinter of mixture of dysprosium titanate and terbium titanate.

8. The gray control rod as claimed in claim 7, wherein the neutron absorber is a cylinder with diameter of D, where 1.0 mm≤D≤8.7 mm, and unit of D is millimeter; mass fraction of element terbium in the neutron absorber is x, where −0.0688×D+0.6388≤x≤−0.0026×D+0.8626; the reactivity worth of the neutron absorber varies no more than 10% within the service time of the neutron absorber.

9. The gray control rod as claimed in claim 8, wherein the neutron absorber is a cylinder with diameter of D and the mass fraction of element terbium in the neutron absorber is x, where −0.0571×D+0.7371≤x≤0.0039×D+0.7261; the reactivity worth of the neutron absorber varies no more than 5% within the service time of the neutron absorber.

10. The gray control rod as claimed in claim 8, wherein the neutron absorber is a cylinder with diameter of D, where 1.3 mm≤D≤3.3 mm.

11. The gray control rod as claimed in claim 10, wherein the neutron absorber is a cylinder with diameter of D, where 1.8 mm≤D≤3.0 mm.

12. The gray control rod as claimed in claim 11, wherein the neutron absorber is a cylinder with diameter of D, where D=2 mm; wherein the mass fraction of element terbium in the neutron absorber is x, where x=70%; the reactivity worth of the neutron absorber varies no more than 2.8% within the service time of the neutron absorber.

13. A gray control rod assembly, comprising a plurality of gray control rods, each gray control rod comprising a cylindrical cladding tube, an upper end plug and a lower end plug for sealing two ends of the cladding tube, a neutron absorber being encapsulated in the cladding tube, wherein the neutron absorber comprises a first absorber material and a second absorber material, reactivity worth of the first absorber material increases as service time of the neutron absorber increases, reactivity worth of the second absorber material decreases as the service time of the neutron absorber increases; and reactivity worth of the neutron absorber varies no more than 15% within the service time of the neutron absorber; wherein the first absorber material is metal terbium, or a compound of terbium, or an alloy comprising terbium; and the second absorber material is metal dysprosium, or a compound of dysprosium, or an alloy comprising dysprosium.

14. The gray control rod assembly as claimed in claim 13, wherein the neutron absorber is terbium-dysprosium alloy, sinter of mixture of terbium oxide and dysprosium oxide, or sinter of mixture of dysprosium titanate and terbium titanate; the neutron absorber is a cylinder with diameter of D, where 1.0 mm≤D≤8.7 mm, and unit of D is millimeter; mass fraction of element terbium in the neutron absorber is x, where −0.0688×D+0.6388≤x≤−0.0026×D+0.8626; the reactivity worth of the neutron absorber varies no more than 10% within the service time of the neutron absorber.

15. The gray control rod assembly as claimed in claim 14, wherein the neutron absorber is a cylinder with diameter of D and the mass fraction of element terbium in the neutron absorber is x, where −0.0571×D+0.7371≤x≤0.0039×D+0.7261; the reactivity worth of the neutron absorber varies no more than 5% within the service time of the neutron absorber.

16. The gray control rod assembly as claimed in claim 14, wherein the neutron absorber is a cylinder with diameter of D, where 1.3 mm≤D≤3.3 mm.

17. The gray control rod assembly as claimed in claim 16, wherein the neutron absorber is a cylinder with diameter of D, where 1.8 mm≤D≤3.0 mm.

18. The gray control rod assembly as claimed in claim 17, wherein the neutron absorber is a cylinder with diameter of D, where D=2 mm; wherein the mass fraction of element terbium in the neutron absorber is x, where x=70%, the reactivity worth of the neutron absorber varies no more than 2.8% within the service time of the neutron absorber.

* * * * *